(12) United States Patent
Chen et al.

(10) Patent No.: US 9,727,930 B2
(45) Date of Patent: Aug. 8, 2017

(54) REAL-TIME DEMAND CONTROL SYSTEM AND METHOD OF CONTROLLING THE SAME

(71) Applicant: DELTA ELECTRONICS, INC., Taoyuan County (TW)

(72) Inventors: Meng-Seng Chen, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 621 days.

(21) Appl. No.: 14/314,431

(22) Filed: Jun. 25, 2014

(65) Prior Publication Data
US 2015/0170297 A1 Jun. 18, 2015

(30) Foreign Application Priority Data
Dec. 13, 2013 (TW) .............................. 102146083 A (51) Int. Cl.
G06Q 50/06 (2012.01)
H02J 3/14 (2006.01)
(52) U.S. Cl.
CPC .............. *G06Q 50/06* (2013.01); *Y02P 90/82* (2015.11)
(58) Field of Classification Search
USPC ........................................................ 700/291
See application file for complete search history.

(56) References Cited

U.S. PATENT DOCUMENTS

2008/0167931 A1* 7/2008 Gerstemeier .......... G06Q 10/06
705/7.22
2009/0040029 A1* 2/2009 Bridges .................. G06Q 50/06
340/12.37
(Continued)

FOREIGN PATENT DOCUMENTS

CN 101539321 9/2009
TW 200807205 2/2008
TW 200939596 9/2009

OTHER PUBLICATIONS

Office Action dated Mar. 16, 2015 from corresponding application No. TW 102146083.
(Continued)

*Primary Examiner* — Ronald Hartman, Jr.
(74) *Attorney, Agent, or Firm* — Hauptman Ham, LLP (57) ABSTRACT

A real-time demand control system includes an analysis control module, a plurality of device management modules, and a plurality of electronic devices. The device management modules integrate electricity consumption of the electronic devices and provide the electricity consumption to the analysis control module. The analysis control module predicts whether the total electricity consumption at the next time period exceeds a contract capacity according to the present total electricity consumption. The analysis control module computes and announces reduction of electricity consumption to the device management modules when the predicted total electricity consumption is possible to exceed the contract capacity. Each device management module computes one or more state adjustment options to the analysis control module according to the reduction of electricity consumption. The analysis control module selects one or more state adjustment options to switch operation states of the electronic devices so as to reduce the total electricity consumption.

18 Claims, 9 Drawing Sheets

(56) References Cited

U.S. PATENT DOCUMENTS

| | | | |
|---|---|---|---|
| 2009/0228151 A1 | 9/2009 | Wang et al. | |
| 2011/0118890 A1* | 5/2011 | Parsons | H02J 3/14 700/295 |
| 2012/0101652 A1* | 4/2012 | Shin | H02J 3/14 700/296 |
| 2013/0066773 A1 | 3/2013 | Chou et al. | |
| 2013/0211557 A1* | 8/2013 | O'Brien | G01D 4/004 700/73 |
| 2013/0282196 A1* | 10/2013 | Tappeiner | G05B 13/02 700/295 |
| 2013/0338949 A1* | 12/2013 | Jetcheva | G06Q 10/06 702/62 |
| 2014/0052305 A1* | 2/2014 | Kearns | H02J 3/00 700/295 |
| 2014/0214229 A1* | 7/2014 | Burke | H02J 3/14 700/296 |
| 2014/0281645 A1* | 9/2014 | Sen | G06Q 50/06 713/340 |
| 2014/0324239 A1* | 10/2014 | Zettel | G05B 13/026 700/291 |
| 2015/0005974 A1* | 1/2015 | Milenkovic | H02J 3/38 700/297 |
| 2016/0111920 A1* | 4/2016 | Pignier | H02J 3/14 307/23 |

OTHER PUBLICATIONS

Office Action dated Dec. 29, 2016 from corresponding application No. CN 201310682123.3.

* cited by examiner

REAL-TIME DEMAND CONTROL SYSTEM AND METHOD OF CONTROLLING THE SAME

BACKGROUND

1. Technical Field

The present disclosure relates generally to a control system and a method of controlling the same, and more particularly to a real-time demand control system and a method of controlling the same.

2. Description of Related Art

In general, the correlative personnel who manage companies, factories, or department stores sign contracts with the power grid (electric company) to limit the instantaneous power (i.e. real-time demands) so as to meet regulated values in the signed contract capacity.

The purpose of signing the contract capacity is that the electric company realizes how much electricity should be provided at different time periods. In addition, one purpose of charging the penalty electricity bill is to avoid occurring unstable power supply operations from the excessive electricity consumption when the instantaneous power of the building is significantly increased. The other purpose is that the electric company needs to purchase additional electricity at a higher price from other electric companies to meet electricity demands for all customers.

In general, the customers do not consider the regulated electricity in the contract capacity when operating electronic devices, such as air conditioners, refrigerators, televisions, computers, and so on. Hence, the total electricity consumption easily exceeds the contract capacity once the customers do not deliberately reduce electricity consumption. Also, the instantaneous power is possible to exceed the contract capacity once the customers use a large number of electronic devices at the same time. As a result, the correlative personnel who manage companies, factories, or department stores will need to pay the penalty electricity bill.

In order to avoid paying the penalty electricity bill, some correlative personnel sign higher contract capacity with the power grid so that the instantaneous power or the total electricity consumption is not easily to exceed the contract capacity. However, the higher signed contract capacity, the higher monthly (quarterly or yearly) demand charge needs to be paid. Furthermore, it is more uneconomic if the electricity consumption is also lower than the contract capacity to avoid the paying the penalty electricity bill.

In addition, in order to avoid breaking the signed contract, some correlative personnel directly limit use rules of the electronic devices. For example, operations in peak hours, temperature of the air conditioner cannot less than 28° C., or only one elevator can be available in the holiday. However, the use limitations would cause uncomfortable and inconvenient operations. Further, the security of the building would significantly be influenced if the monitoring system or surveillance system is limited.

SUMMARY

An object of the present disclosure is to provide a real-time demand control system and a method of controlling the same. The operation states of the electronic devices will be adjusted to reduce total electricity consumption when the predicted total electricity consumption at the next time period is possible to exceed the contract capacity.

In order to achieve the above-mentioned object, the real-time demand control system includes an analysis control module, a plurality of device management modules, and a plurality of electronic devices. The device management modules are correspondingly connected to the electronic devices to receive and integrate electricity consumption of the electronic devices, and provide the integrated electricity consumption to the analysis control module. The analysis control module predicts whether the total electricity consumption at the next time period exceeds a contract capacity according to the present total electricity consumption. The analysis control module computes reduction of electricity consumption and announces that to the device management modules when the predicted total electricity consumption is possible to exceed the contract capacity. Each device management module computes one or more state adjustment options to the analysis control module according to the reduction of electricity consumption. The analysis control module selects one or more state adjustment options to switch operation states of the electronic devices so as to reduce the total electricity consumption.

Comparing to the conventional technologies, the present disclosure can achieve following features and advantages. The real-time demand control system can predict the possible total electricity consumption of a building or an area at the next time period (such as fifteen minutes later, thirty minutes later, or sixty minutes later), and judge whether the total electricity consumption is possible to exceed the contract capacity. Accordingly, the reduction of electricity consumption can be early computed to reduce the total electricity consumption by adjusting state operations of the electronic devices in the building or the area, thus effectively avoiding the penalty electricity bill because of the excess electricity consumption.

In addition, the device management modules can further compute and analysis influence degrees between different operation states of the electronic devices. Accordingly, the analysis control module selects the state adjustment option which can achieve the minimum influence to the building or the area.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Reference will now be made to the drawing figures to describe the present invention in detail.

Figure 1:
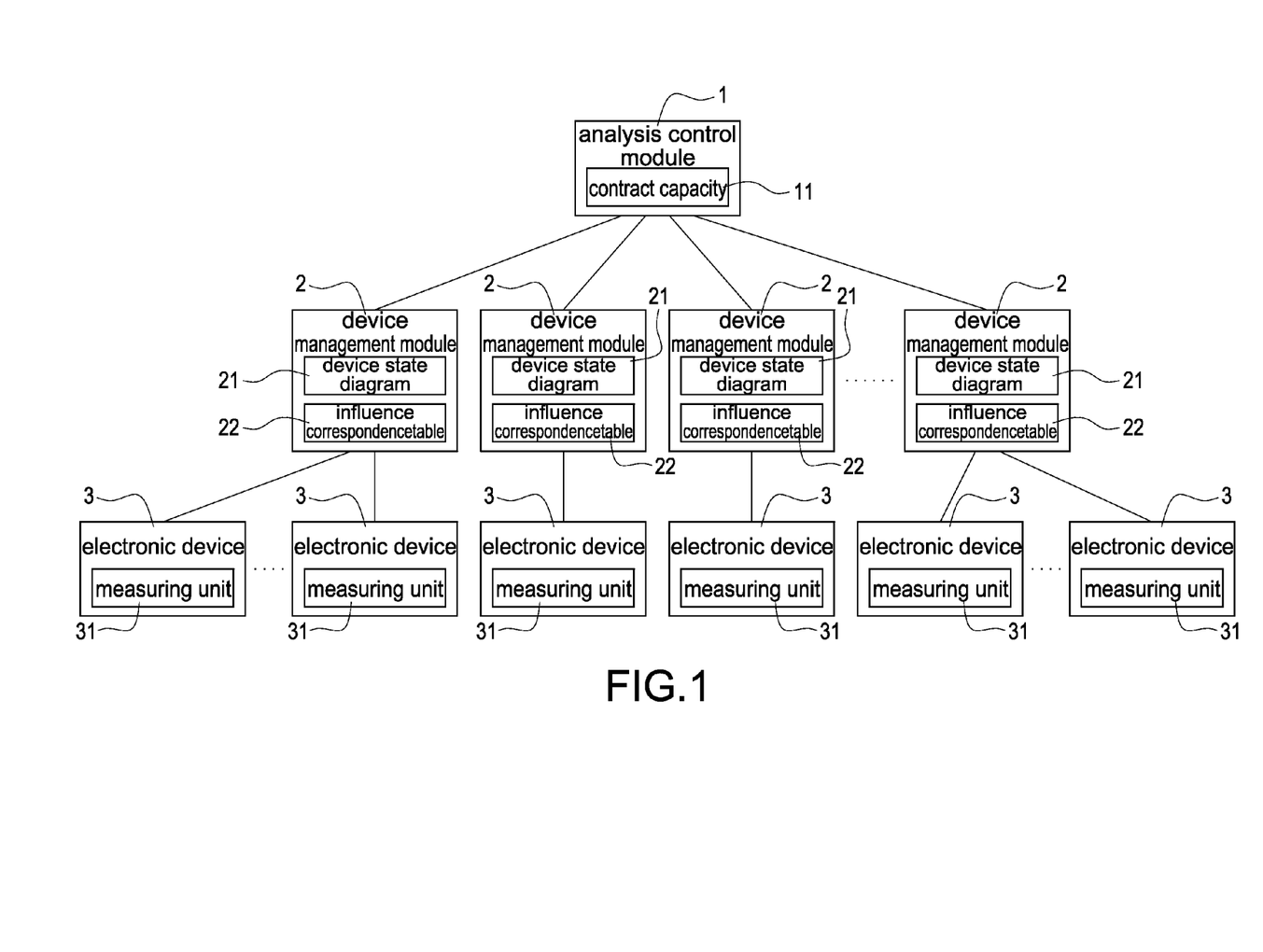
FIG. 1 is a system structure diagram of a first embodiment according to the present disclosure.

Reference is made to FIG. 1 which is a system structure diagram of a first embodiment according to the present disclosure. The present invention discloses a real-time demand control system (referred to as a "control system" hereinafter). The control system is installed in a specific building for monitoring information of electricity consumption of the specific building so as to timely adjust operation states of the electronic devices installed in the building, thus ensuring total electricity consumption of the electronic devices does not exceed the contract capacity at each time period. Accordingly, it is to effectively avoid the penalty electricity bill because of the excessive electricity consumption.

As shown in FIG. 1, the control system mainly has an analysis control module 1, a plurality of device management modules 2, and a plurality of electronic devices 3. The analysis control module 1 is connected to the device management modules 2 and the device management modules 2 are connected to the electronic devices 3. The analysis control module 1 is mainly installed in a central control computer (not labeled) of a building, and connected to the device management modules 2 by a wired or a wireless manner. The device management modules 2 are arranged between the analysis control module 1 and the electronic devices 3, and connected to one or more electronic devices 3 by a wired or a wireless manner. In particular, the wired manner can be implemented by a power line communication (PLC), network lines, or various bus lines. Also, the wireless manner can be implemented by Wi-Fi, Bluetooth, ZigBee, or radio frequency (RF). However, the embodiments are only exemplified but are not intended to limit the scope of the disclosure.

Each electronic device 3 has a measuring unit 31, and the measuring units 31 are provided to measure electricity consumption of the electronic devices 3 under different operation states, such as a shutdown operation, a standby operation, a first mode operation, a second mode operation, and so on. The electronic devices 3 transmit the measured electricity consumption to the device management modules 2 to which the electronic devices 3 are correspondingly connected.

The device management modules 2 integrate the received electricity consumption transmitted from the electronic devices 3, and then transmit the integrated electricity consumption to the analysis control module 1 so that the analysis control module 1 can execute follow-up operations of computation, prediction, and judgment. Especially, in this embodiment, each device management module 2 is connected to one or more electronic devices 3 in the same type or in the same area.

Figure 2:
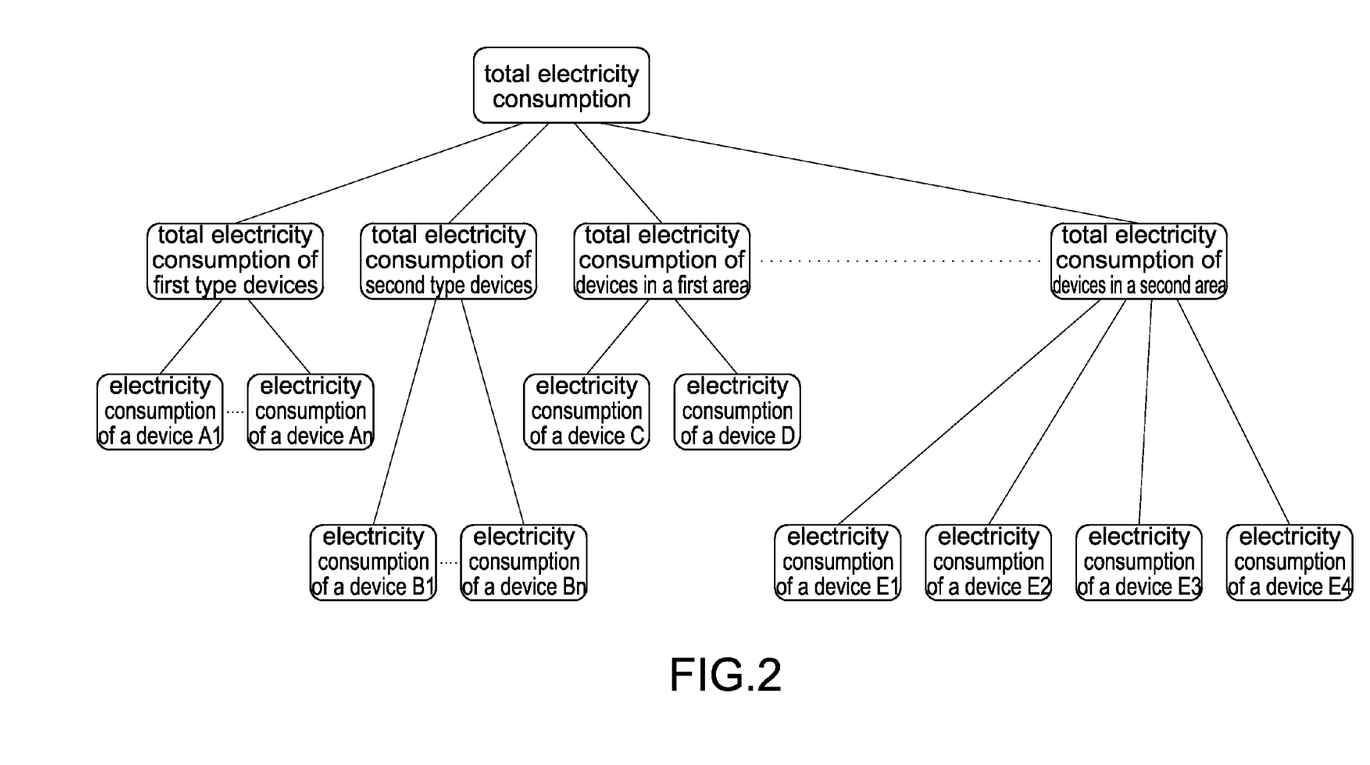
FIG. 2 is a schematic view of computation of electricity consumption of electronic devices of a first embodiment according to the present disclosure.

Reference is made to FIG. 2 which is a schematic view of computation of electricity consumption of electronic devices of the first embodiment according to the present disclosure. As shown in FIG. 2, a device management module is simultaneously connected to all first type devices, such as large air conditioners, and separately receives electricity consumption of from a device A1 (such as an air handling unit, AHU), a device A2 (such as a water side system), to a device An (such as a chilled water pump, CHP) and integrates the received electricity consumption into a total electricity consumption of the first type devices. In addition, another device management module is simultaneously connected to all second type devices, such as surveillance systems, and separately receives electricity consumption of from a device B1 (such as a monitoring host), a device B2 (such as a video camera), to a device Bn (such as a storage apparatus) and integrates the received electricity consumption into a total electricity consumption of the second type devices.

Further another device management module is simultaneously connected to all devices installed in a first area (such as in an office area), and separately receives electricity consumption of a device C (such as a telephone-switching system) and a device D (such as an announcement system) and integrates the received electricity consumption into a total electricity consumption of the devices in the first area. Further another device management module is simultaneously connected to all devices installed in a second area (such as a public area), and separately receives electricity consumption of a device E1 (such as a first elevator), a device E2 (such as a second elevator), a device E3 (such as a third elevator), a device E4 (such as a corridor light) and integrates the received electricity consumption into a total electricity consumption of the devices in the second area. However, the embodiment is only preferably exemplified but is not intended to limit the scope of the disclosure.

Refer to FIG. 1 again, the device management modules 2 integrate the received electricity consumption transmitted from the corresponding electronic devices 3, and then transmit the integrated electricity consumption to the analysis control module 1. In this embodiment, the analysis control module 1 stores a contract capacity 11 which is signed by correlative personnel of managing the control system to that of the electric company. The contract capacity 11 mainly records different warning electricity consumptions at all time periods. In other words, extra penalty electricity bill will be charged once the total electricity consumption exceeds the corresponding warning electricity consumption in the contract capacity 11 at one time period.

In this embodiment, the analysis control module 1 continually receives the electricity consumption transmitted from the device management modules 2, and computes present total electricity consumption. Afterward, the analysis control module 1 predicts future total electricity consumption at the next time period according to the total electricity consumption. In particular, the above-mentioned "time period" can be fifteen minutes, thirty minutes, or sixty minutes depended on the contract contents. In this embodiment, the analysis control module 1 can predict future total electricity consumption by algorithms or according to historical electricity consumption of the control system. In particular, the above-mentioned algorithms can be Time Series Analysis (TSA), Neural Network (NN), or so on. However, the embodiments are only exemplified but are not intended to limit the scope of the disclosure.

The main feature of the present disclosure is that the analysis control module 1 can judge whether the predicted total electricity consumption is possible to exceed the warning electricity consumption after the analysis control module 1 computes the predicted total electricity consumption. Further, if the predicted total electricity consumption is possible to exceed the warning electricity consumption, the analysis control module 1 computes a required reduction of electricity consumption in real time. More specifically, the electricity consumption of the control system is reduced in required reduction of electricity consumption before the next time period; the total electricity consumption will not exceed the warning electricity consumption at the next time period.

According to the required reduction of electricity consumption, the device management modules 2 correspondingly compute executable state adjustment options of the electronic devices 3 in real time, and provide the computed executable state adjustment options to the analysis control module 1. In particular, each state adjustment option is corresponding to a state switch which can be executed by the electronic device 3, and the electricity consumption of the electronic device 3 can be reduced after the state switch is executed by the electronic device 3.

After the analysis control module 1 receives the state adjustment options transmitted from the device management modules 2 and selects at least one state adjustment option, the device management modules 2 controls the state adjustment of the corresponding electronic devices 3 to reduce the total electricity consumption according to the selected state adjustment option(s).

Figure 3:
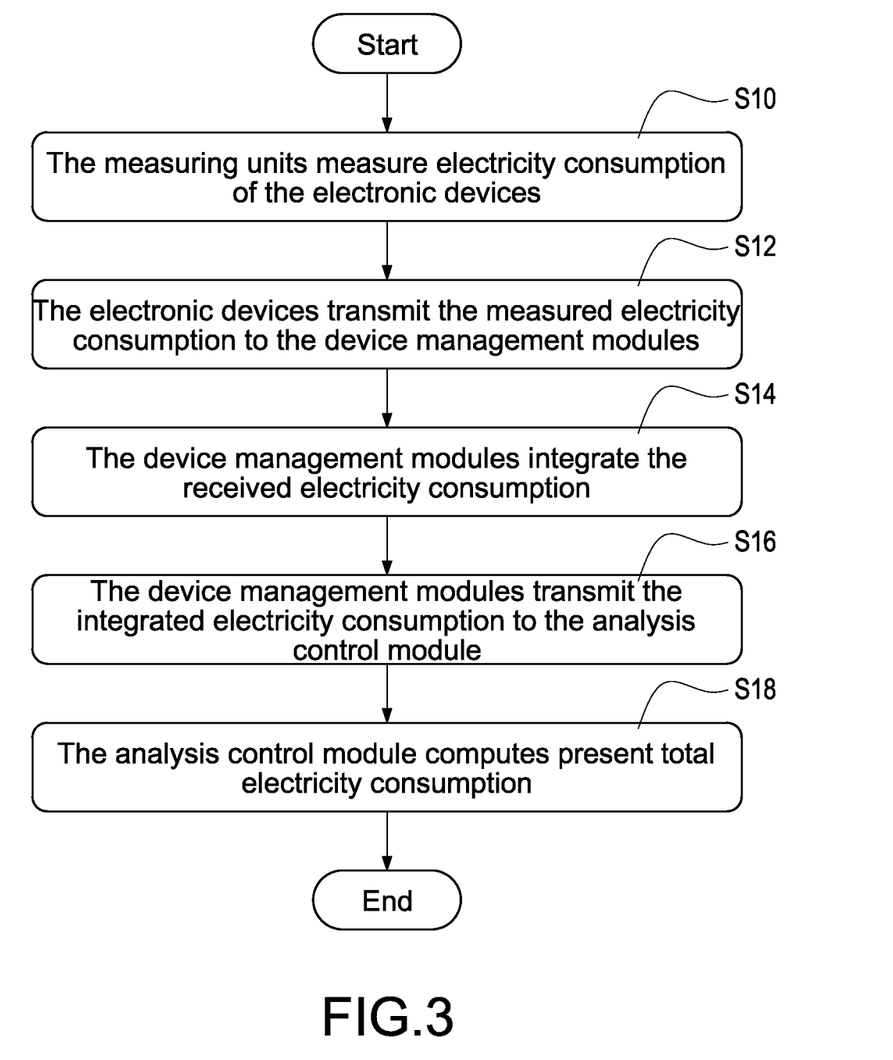
FIG. 3 is a flowchart of a method of computing electricity consumption of electronic devices of a first embodiment according to the present disclosure.

Reference is made to FIG. 3 which is a flowchart of a method of computing electricity consumption of electronic devices of a first embodiment according to the present disclosure. First, the measuring units 31 correspondingly measure electricity consumption of the electronic devices 3 (S10), and then the electronic devices 3 transmit the measured electricity consumption to the device management modules 2 to which the electronic devices 3 are correspondingly connected (S12). Afterward, the device management modules 2 integrate the received electricity consumption (S14), and transmit the integrated electricity consumption to the analysis control module 1 (S16) so that the analysis control module 1 can compute present total electricity consumption (S18).

Figure 4:
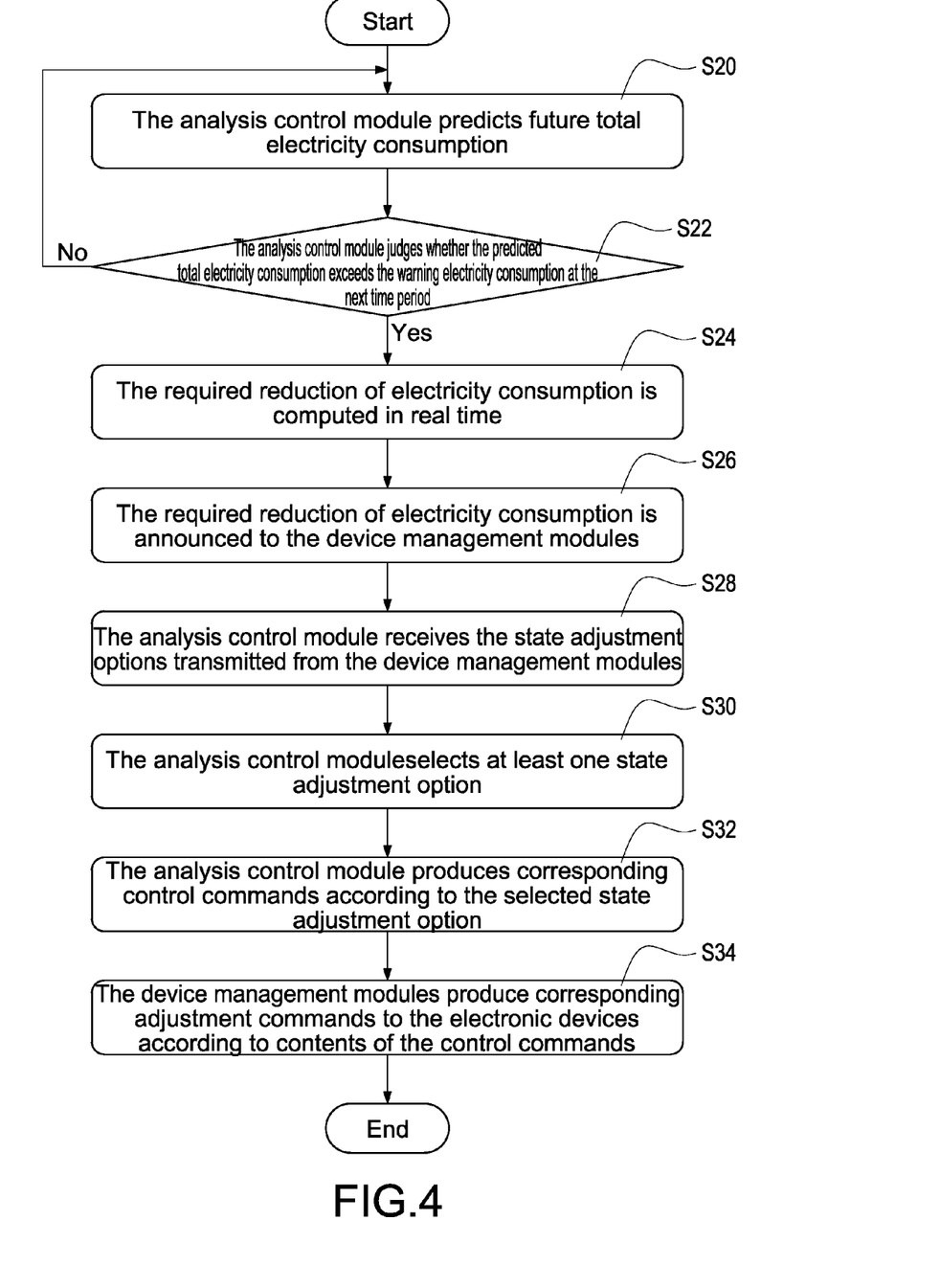
FIG. 4 is a flowchart of a method of controlling a real-time control system of a first embodiment according to the present disclosure.

Reference is made to FIG. 4 which is a flowchart of a method of controlling a real-time control system of a first embodiment according to the present disclosure. First, the analysis control module 1 predicts future total electricity consumption according to the present total electricity consumption (S20). Afterward, the analysis control module 1 judges whether the predicted total electricity consumption exceeds the warning electricity consumption at the next time period (S22). Especially, the above-mentioned "future" means the next second, next minute, or next short-term time period, not a long-term future.

If the predicted total electricity consumption does not exceed the warning electricity consumption at the next time period, the step (S20) is executed again, that is, the analysis control module 1 predicts future total electricity consumption according to the present total electricity consumption. On the contrary, if the predicted total electricity consumption is possible to exceed the warning electricity consumption at the next time period, the required reduction of electricity consumption is computed in real time (S24). Afterward, the required reduction of electricity consumption is announced to each of the device management modules 2 (S26). Accordingly, the device management modules 2 can correspondingly compute executable state adjustment options which can be executed by the electronic devices 3 according to the required reduction of electricity consumption.

Afterward, the analysis control module 1 receives the state adjustment options transmitted from the device management modules 2 (S28), and selects at least one state adjustment option (S30). In particular, the analysis control module 1 can select the state adjustment option(s) by the corresponding algorithms. Also, the above-mentioned algorithms can be Linear Programming (LP), Genetic Algorithm (GA), Optimization Algorithm (OA), or so on. However, the embodiments are only exemplified but are not intended to limit the scope of the disclosure. Finally, the analysis control module 1 produces corresponding control commands according to the selected state adjustment option(s) (S32). Afterward, the device management modules 2 produce corresponding adjustment commands to the electronic devices 3 according to contents of the control commands (S34) after receiving the control commands. Accordingly, the state adjustment of the corresponding electronic devices 3 can be executed according to the adjustment commands to reduce total electricity consumption.

Especially, in the step (S30), the analysis control module 1 selects the option which can achieve the maximum reduction of electricity consumption or the option which can achieve the minimum influence for the control system. The detailed operation of the state adjustment will be described hereinafter as follows.

In the step (S28), the analysis control module 1 receives the state adjustment options computed by the device management modules 2. In particular, the state adjustment options are computed by the device management modules 2 according to one or more device state diagrams 21 stored in each device management module 2 as shown in FIG. 1.

Figure 5:
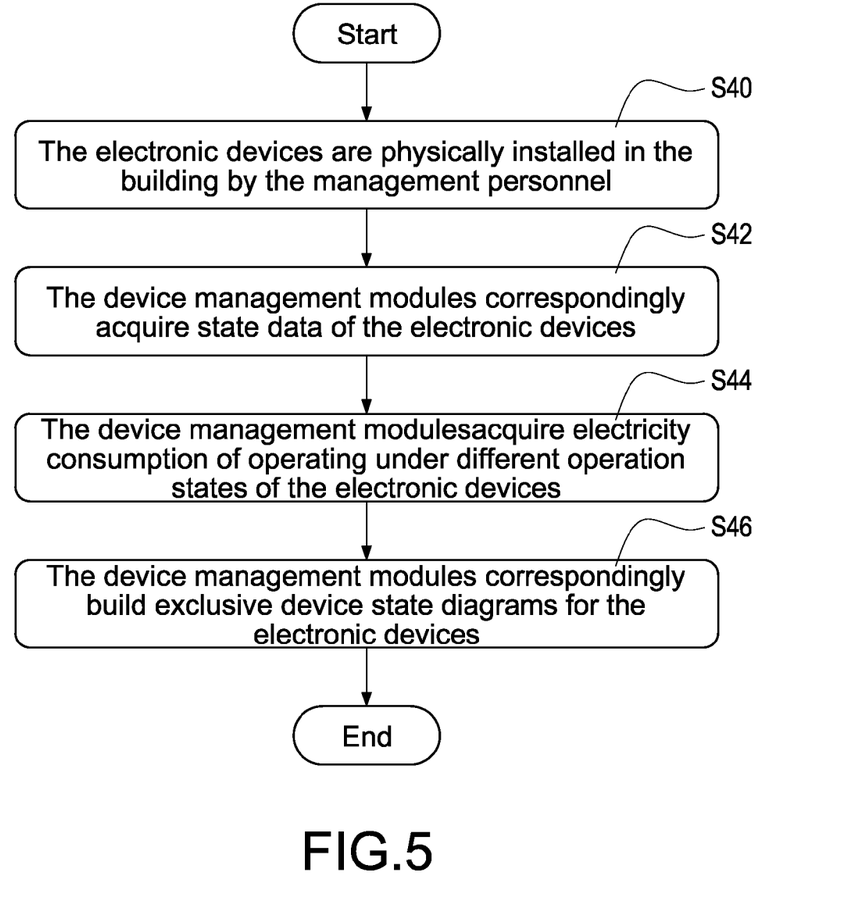
FIG. 5 is a flowchart of a method of acquiring device state diagrams of a first embodiment according to the present disclosure.

Reference is made to FIG. 5 which is a flowchart of a method of acquiring device state diagrams of a first embodiment according to the present disclosure. First, the electronic devices 3 are physically installed in the building by the management personnel (S40). Afterward, the device management modules 2 correspondingly acquire state data of the electronic devices 3 (S42), and acquire electricity consumption of operating under different operation states of the electronic devices 3 (S44). Finally, the device management modules 2 can correspondingly build exclusive device state diagrams 21 for the electronic devices 3 according to the data acquired in the steps (S40) and (S42) (S46).

As mentioned above, each device state diagram 21 records switchable operation states of the corresponding electronic device 3 and the electricity consumption of operating under different operation states of the electronic device 3.

Figure 6:
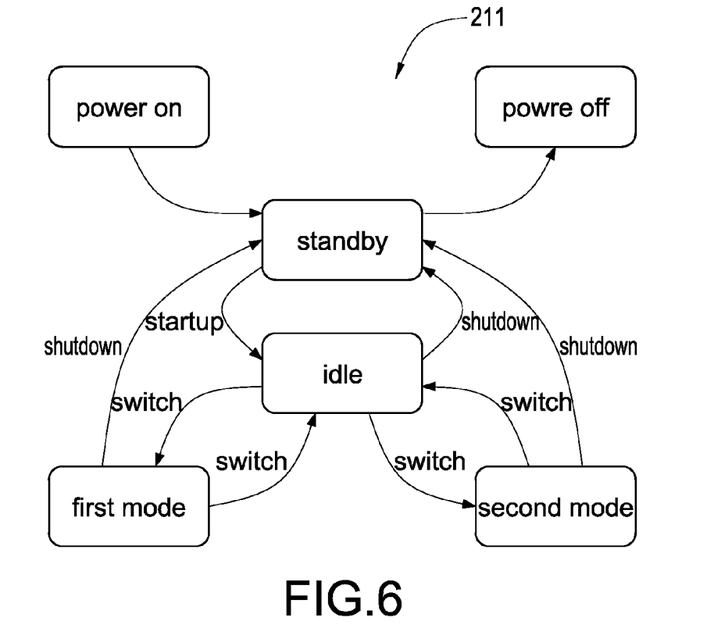
FIG. 6 is a device state diagram of a first embodiment according to the present disclosure.
Figure 7:
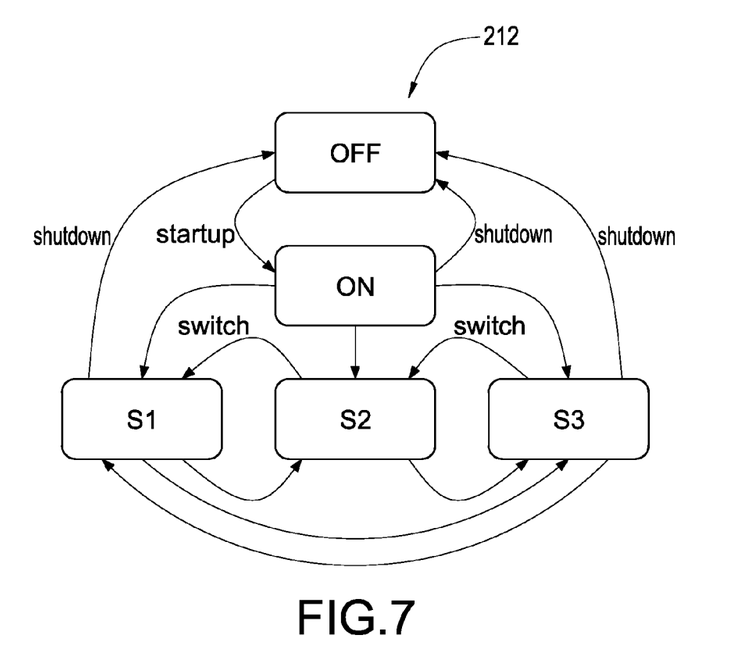
FIG. 7 is a device state diagram of a second embodiment according to the present disclosure.

Reference is made to FIG. 6 and FIG. 7 which are a device state diagram of a first embodiment and a device state diagram of the second embodiment according to the present disclosure, respectively. FIG. 6 illustrates a first device state diagram 211. As shown in the first device state diagram 211, the electronic device 3 is operated in at least four states, such as a standby state, an idle state, a first mode state, and a second mode state. In particular, the state switch between the first mode state and the second mode state can be implemented by temperature adjustment. Because electricity consumptions of the electronic devices 3 in different operation states are distinct, the electricity consumption of the electronic devices 3 will be varied. In this embodiment, the device management modules 2 can acquire one or more state adjustment options by judging which electronic devices 3 can be adjusted, which adjustments can be executed of the electronic devices 3, and what variation of electricity consumption will occur after the state adjustment.

FIG. 7 illustrates a second device state diagram 212. As shown in the second device state diagram 212, the electronic device 3 is operated in at least five states, such as an OFF state, an ON state, a S1 state, a S2 state, and a S3 state. In particular, the operation states of the electronic device 3 can be arbitrarily converted among the five states. The device management module 2 can create a table 1 below according to the second device state diagram 212.

TABLE 1

| | variation of electricity consumption | influence index |
|---|---|---|
| from OFF to ON | +5 kW | 1 |
| from ON to S1 | +15 kW | 5 |
| from S1 to S2 | +10 kW | 2 |
| from S2 to S3 | +10 kW | 2 |
| from S3 to OFF | −40 kW | 10 |

As shown in table 1, the device management module 2 can compute variation of electricity consumptions between two operation states of the electronic device 3 according to the second device state diagram 212. Accordingly, the device management module 2 can provide one or more state adjustment options, which are most able to achieve the reduction of electricity consumption, to the analysis control module 1.

For example, it is assumed that the electronic device 3 is in the S2 state. According to the Table 1, the variation of electricity consumption is 10 kW reduction when the operation state is switched from S2 to S1; the variation of electricity consumption is 25 kW reduction when the operation state is switched from S2 to ON; and the variation of electricity consumption is 30 kW reduction when the operation state is switched from S2 to OFF. When the device management modules 2 receive the control command of reducing electricity consumption, the state adjustment options, such as the three options above can be computed by the device management modules 2 and the computed state adjustment options can be selected by the analysis control module 1 so as to reduce the total electricity consumption.

Especially, in one embodiment of the present disclosure, the device management modules 2 can analyze historical electricity consumption of the corresponding electronic devices 3 to acquire state data and electricity consumption of operating under different operation states of the electronic devices 3. In another embodiment of the present disclosure, the device management modules 2 can simulate the electronic devices 3 by a simulator (not shown) to acquire the state data and electricity consumption of operating under different operation states of the electronic devices 3. In further another embodiment of the present disclosure, the device management modules 2 can directly receive state data and electricity consumption of operating under different operation states of the electronic devices 3 which are inputted by the management personnel. However, the embodiments are only preferably exemplified but are not intended to limit the scope of the disclosure.

As shown in Table 1, the device management modules 2 can further compute influence indices between different operation states of the electronic device 3. More specifically, one or more influence correspondence tables 22 stored in each device management module 2 as shown in FIG. 1. Each influence correspondence table 22 records influence degrees between different operation states of the electronic device 3 at each time period. In addition, influence degrees for the same electronic device 3 operated at different time periods are not identical. For example, an influence degree of an elevator malfunctioning at the time of going to work, such as from 8:00 am to 10:00 am is higher than that of the elevator malfunctioning at office hours, such as from 2:00 μm to 4:00 μm. In other words, the same electronic device 3 is possible to corresponding to one or more influence correspondence tables 22.

In this embodiment, it is assumed that the influence correspondence tables 22 are set by the management personnel after the management personnel logins the device management modules 2 or the analysis control module 1. In addition, the management personnel can install additional sensors, such as monitor(s) or electronic questionnaire(s) (not shown) in the control system to acquire operation states and analyze influence degrees of the electronic device 3 operated at each time period. An exemplified influence correspondence table 22 is shown below.

TABLE 22

| | influence degree | | | | | |
|---|---|---|---|---|---|---|
| | very low | low | slightly low | medium | slightly high | high | very high |
| Area | | | | | | | |
| Occupancy | | | | | | | |
| Safety | | | | | | | |
| Convenience | | | | | | | |
| Instant | | | | | | | |

In this embodiment, the elevator described above is exemplified to further demonstrate the present disclosure. It is assumed that an elevator group with four elevators is provided, wherein two elevators are not in operation. The influence correspondence table 22 of state adjustment of the elevator group at the time of going to work (from 8:00 am to 10:00 am) is exemplified as follows. The influence degree of the Area is "slightly low" because the elevator group is installed in the specific area. The influence degree of the Occupancy is "very high" because almost everyone needs to take the elevator. The influence degree of the Safety is "very low" because whether the elevators are operated or not depending on the electricity consumption in this embodiment and almost unrelated to the safety. The influence degree of the Convenience is "high" because the users need to spend more time waiting for the elevators or take the stairs instead of the elevator. The influence degree of the Instant is "medium" because the two elevators not in operation lead to the limited influence. In addition, the influence correspondence table 22 of state adjustment of the elevator group at office hours (from 2:00 μm to 4:00 μm) is different from that of state adjustment of the elevator group at the time of going to work so that the computed influence indices are not the same.

In this embodiment, the influence degree is a set of several influence factors, and the influence factors mainly includes the above-mentioned items, namely Area ($a(t)$), Occupancy ($o(t)$), Safety ($s(t)$), Convenience ($c(t)$), and Instant ($i(t)$). In particular, the term t represents the time period.

In this embodiment, the analysis formula of the influence degree is: $f(a(t),o(t),s(t),c(t),i(t))$.

Figure 8:
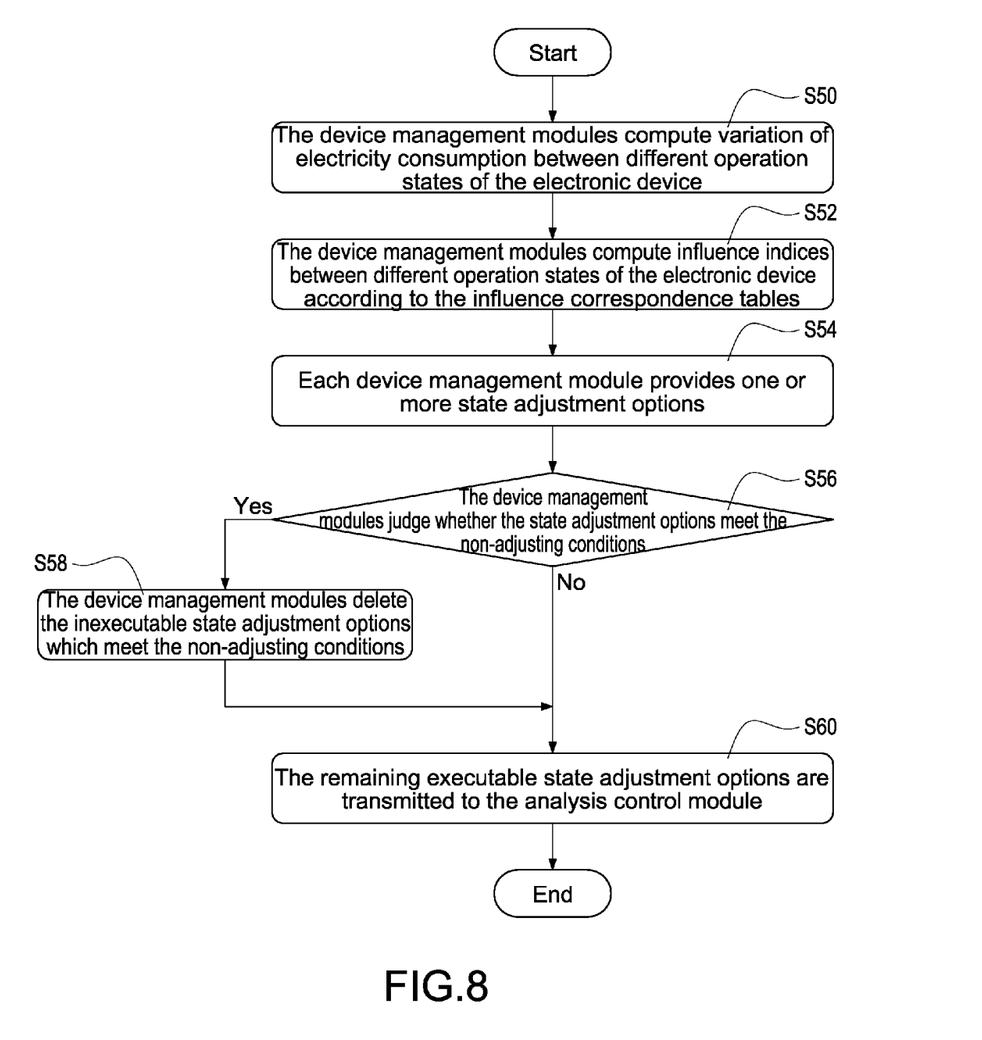
FIG. 8 is a flowchart of a method of computing state adjustment options of a first embodiment according to the present disclosure.

Reference is made to FIG. 8 which is a flowchart of a method of computing state adjustment options of a first embodiment according to the present disclosure. When the device management modules 2 receive the reduction of electricity consumption according to the state diagrams 21, the device management modules 2 compute variation of electricity consumption between different operation states of the electronic device 3 (S50). Afterward, the device management modules 2 compute influence indices between different operation states of the electronic device 3 according to the influence correspondence tables 22 (S52). Finally, each device management module 2 can provide one or more state adjustment options (S54).

Especially, each device management module 2 can further receive one or more non-adjusting conditions (not shown). The non-adjusting conditions record the conditions or time periods which cannot be adjusted by the electronic devices 3. For example, the elevator group cannot be adjusted at the time of going to work and getting off work. Further, temperature of the air conditioner in a meeting room cannot be adjusted or cannot be adjusted to up to 26° C. when a meeting is in progress. After, the device management modules 2 compute one or more state adjustment options in the step (S54), the device management modules 2 judge whether the state adjustment options meet the non-adjusting conditions (S56). If the all computed state adjustment options do not meet the non-adjusting conditions, the device management modules 2 transmit all state adjustment options to the analysis control module 1 (S60). On the contrary, if one or more state adjustment options meet the non-adjusting conditions, the device management modules 2 delete the inexecutable state adjustment option(s) which meet(s) the non-adjusting conditions (S58). Afterward, the remaining executable state adjustment options are transmitted to the analysis control module 1 (S60).

Figure 9:
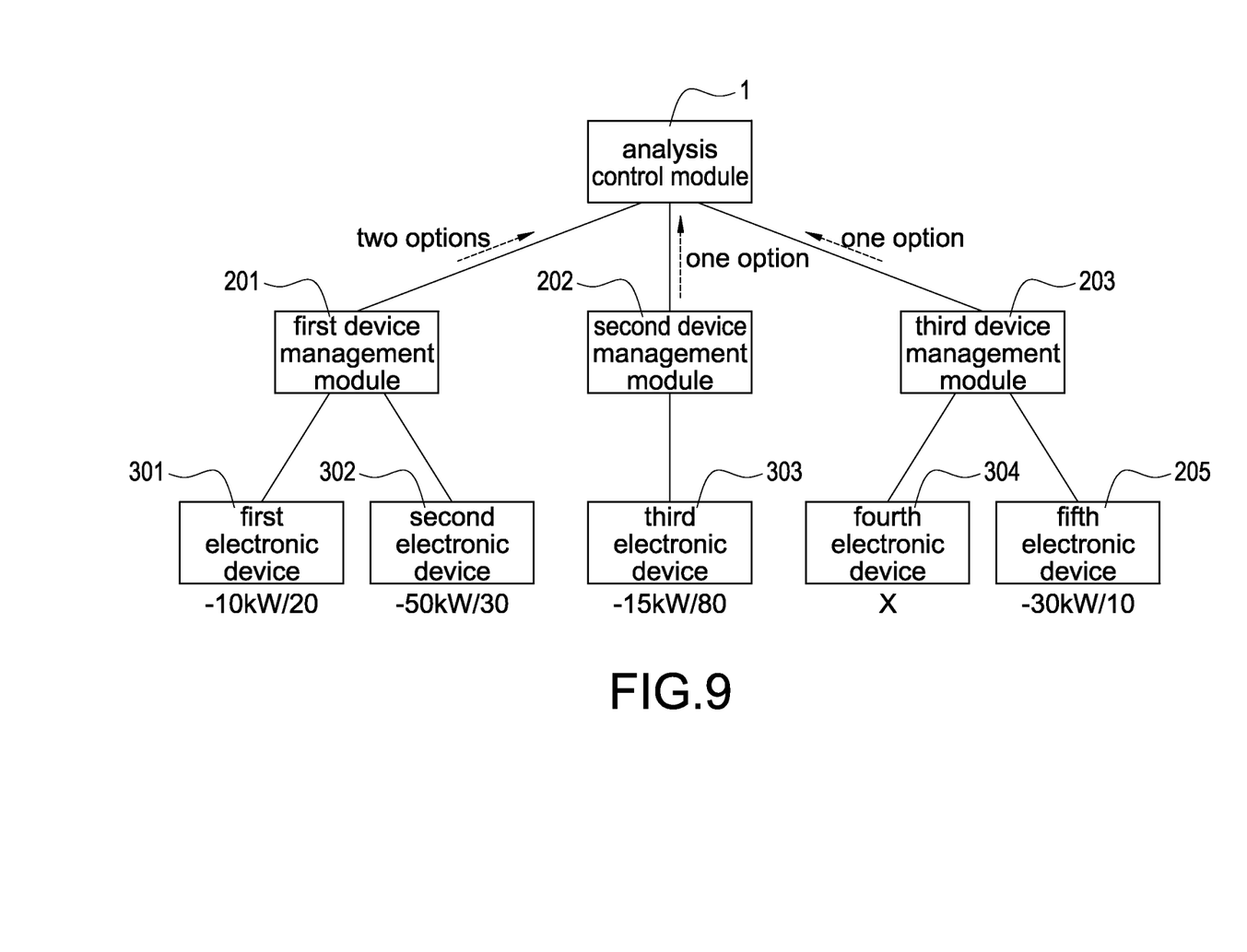
FIG. 9 is a flowchart of a method of transmitting the state adjustment options of a first embodiment according to the present disclosure.

Reference is made to FIG. 9 which is a flowchart of a method of transmitting the state adjustment options of a first embodiment according to the present disclosure. In this embodiment, the analysis control module 1 is connected to a first device management module 201, a second device management module 202, and a third device management module 203. The first device management module 201 is connected to a first electronic device 301 and a second electronic device 302, the second device management module 202 is connected to a third electronic device 303, and the third device management module 203 is connected to a fourth electronic device 304 and a fifth electronic device 305.

When the analysis control module 1 announces that the reduction of electricity consumption is equal to 30 kW, the device management modules 201-203 compute the executable state adjustment options in real time. As shown in FIG. 9, two state adjustment options are acquired after the first device management module 201 computes: one state adjustment option provides 10 kW reduction of electricity consumption for the first electronic device 301 and its influence index is equal to 20; the other state adjustment option provides 50 kW reduction of electricity consumption for the second electronic device 302 and its influence index is equal to 30. Also, one state adjustment option is acquired after the second device management module 202 computes: the state adjustment option provides 15 kW reduction of electricity consumption for the third electronic device 303 and its influence index is equal to 80. Also, one state adjustment option is acquired after the third device management module 203 computes: the state adjustment option provides 30 kW reduction of electricity consumption for the fifth electronic device 305 and its influence index is equal to 10. In addition, no state adjustment option is acquired for the fourth electronic device 304 because the fourth electronic device 304 cannot be adjusted.

The analysis control module 1 can receive two options from the first device management module 201, receive one option from the second device management module 202, and receive one option from the third device management module 203. Accordingly, the analysis control module 1 can select and execute one or more executable state adjustment options to achieve totally 30 kW reduction of electricity consumption and also achieve the minimum influence (namely, the sum of the influence indices is minimal) for the building in which the control system is installed. In other embodiment, however, the influence indices can be not considered, that is, the analysis control module 1 can only select and execute the executable state adjustment options to the reduction of electricity consumption.

In this embodiment, the analysis control module 1 announces a general command to the device management modules 201-203 so that device management modules 201-203 transmit the all computed options to the analysis control module 1 after the device management modules 201-203 compute the options which can achieve the reduction of electricity consumption. Besides, the analysis control module 1 can also announce a specified command to the device management modules 201-203. As described in the embodiment above, the analysis control module 1 can announce the specified command to request the device management modules 201-203 to transmit the state adjustment options which can be provided to achieve the reduction of electricity consumption after judging 30 kW reduction of electricity consumption is required. In other words, other state adjustment options which cannot be provided to achieve the reduction of electricity consumption need not to be transmitted to the analysis control module 1. Therefore, the analysis control module 1 can more quickly and more accurately select the executable state adjustment options in real time. In addition, the analysis control module 1 can only request a part of device management modules 2 to transmit the state adjustment options according to the announcement of the specified command. However, the embodiment is only preferably exemplified but is not intended to limit the scope of the disclosure.

In the above-mentioned embodiment, the analysis control module 1, the device management modules 2, and the electronic devices 3 are installed in the same building or area. Further, the analysis control module 1, the device management modules 2, and the electronic devices 3 can be also installed in different buildings or areas.

Figure 10:
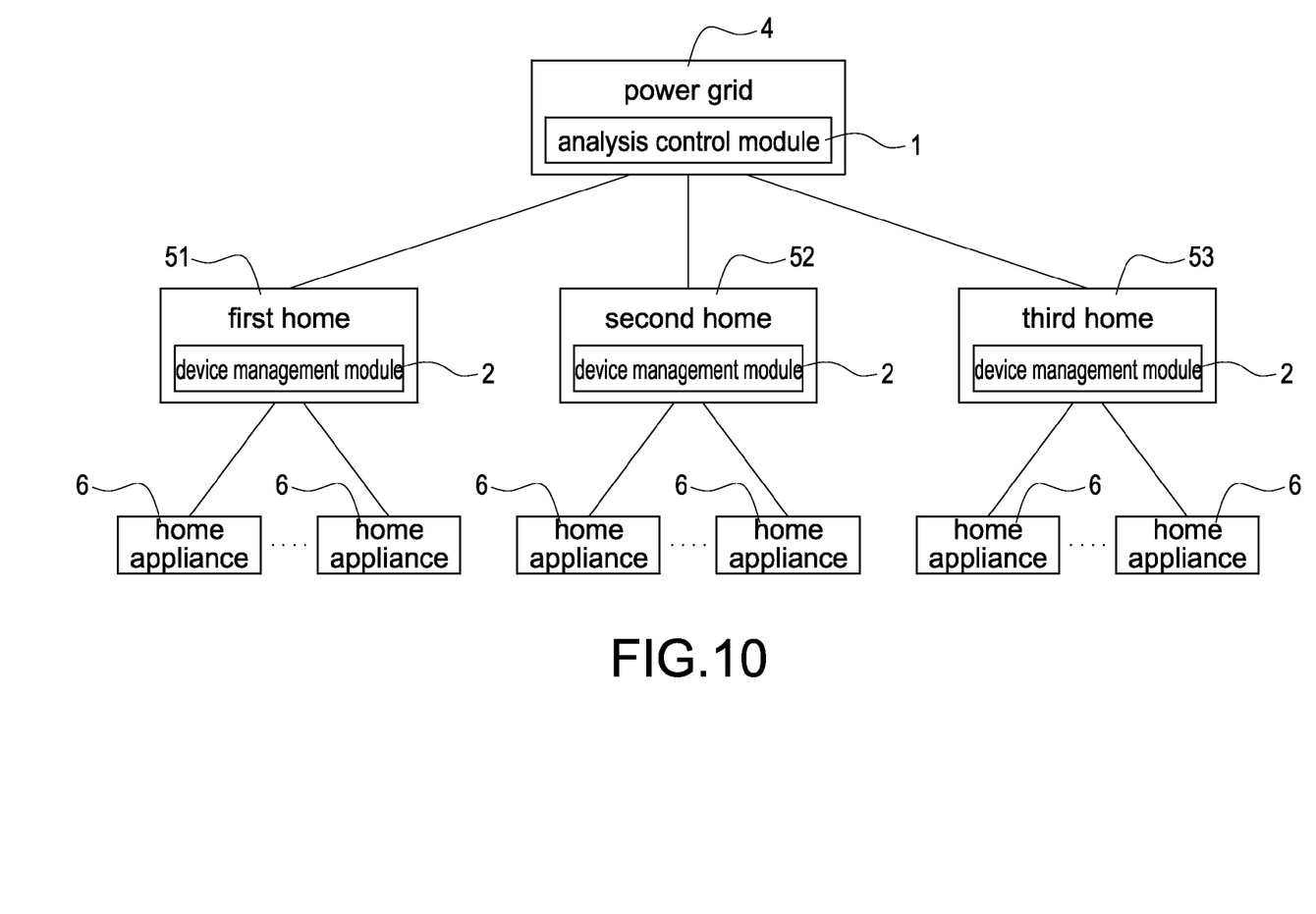
FIG. 10 is a system structure diagram of the second embodiment according to the present disclosure.

Reference is made to FIG. 10 which is a system structure diagram of the second embodiment according to the present disclosure. In this embodiment, the control system mainly includes a power grid 4, a plurality of homes 51-53, and a plurality of home appliances 6. In particular, the analysis control module 1 is installed in the power grid 4; the device management modules 2 are correspondingly installed in the first home 51, the second home 52, and the third home 53; and electronic devices 3 are the home appliances 6.

In this embodiment, the homes 51-53 can sign contracts with the power grid 4 so that the homes 51-53 can in concert with the power grid 4 for electricity control strategies, and the power grid 4 provides the electricity subsidies to the homes 51-53. For example, when the power grid 4 provides a strategy of restrictions on electricity use to the analysis control module 1, the analysis control module 1 announces the request of reduction of electricity consumption to the homes 51-53. The device management modules 2 of the homes 51-53 correspondingly compute the executable state adjustment options of the home appliances 6, and then the computed state adjustment options are transmitted to the analysis control module 1 of the power grid 4. Accordingly, the power grid 4 can select one or more state adjustment options through the analysis control module 1 to control the state adjustment of the specific home appliances of the specific home(s) to reduce the total electricity consumption.

For example, electric lights in the first home 51 are turned off and temperature of the air conditioner in the second home 52 is adjusted so as to achieve restrictions on electricity use for the power grid 4.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A real-time demand control system comprising:
   a plurality of electronic devices, each electronic device having a measuring unit; the measuring units configured to correspondingly measure electricity consumption of the electronic devices;
   a plurality of device management modules connected to the electronic devices, and configured to receive and integrate the electricity consumption of the electronic devices;
   an analysis control module configured to store a contract capacity, and the contract capacity configured to record warning electricity consumptions of the control system at different time periods; the analysis control module connected to the device management modules, and configured to correspondingly receive electricity consumptions transmitted from the device management modules and compute the received electricity consumptions to a total electricity consumption; the analysis control module configured to predict a future total electricity consumption according to the total electricity consumption;
   wherein
      the analysis control module is configured to compute reduction of electricity consumption and the device management modules are configured to compute a plurality of state adjustment options according to the reduction of electricity consumption when the predicted future total electricity consumption is possible to exceed the warning electricity consumption at the next time period;
      the device management modules are configured to control state adjustment of the corresponding electronic devices to reduce total electricity consumption when the analysis control module is configured to select at least one state adjustment option,
      the device management modules have a plurality of device state diagrams, and the device state diagrams are configured to record switchable operation states of the corresponding electronic devices and the electricity consumption of operating under different operation states of the electronic devices; and
      the device management modules are configured to compute variation of the electricity consumption between the operation states to acquire the state adjustment options according to the device state diagrams.

2. The real-time demand control system in claim 1, wherein the device management modules are correspondingly connected to a plurality of electronic devices of a same type.

3. The real-time demand control system in claim 2, wherein the analysis control module is installed in a power grid; the device management modules are correspondingly installed in homes which are supplied power by the power grid; each of the device management modules is connected to the electronic devices in the same home.

4. The real-time demand control system in claim 1, wherein the device management modules are correspondingly connected to a plurality of electronic devices in the same area.

5. The real-time demand control system in claim 1, wherein the device management modules have a plurality of influence correspondence tables, and the device management modules correspondingly compute influence indices between different operation states of the electronic devices according to the influence correspondence tables, wherein the influence correspondence tables record influence degrees between different operation states of the electronic device at each time period; the analysis control module is configured to select one or more state adjustment options which provide the minimum influence for the control system according to the influence indices.

6. The real-time demand control system in claim 1, wherein the device management modules have a plurality of non-adjusting conditions, and the non-adjusting conditions are configured to record the conditions or time periods which cannot be adjusted by the electronic devices connected to the device management modules; the device management modules are configured to delete the state adjustment option which cannot be adjusted according to the non-adjusting conditions.

7. A method of controlling a real-time demand for a control system, the control system having an analysis control module, a plurality of device management modules, and a plurality of electronic devices, wherein the analysis control module is connected to the device management modules, and the device management modules are correspondingly connected to the electronic devices; the method comprising the following steps:
   (a) computing present total electricity consumption of the control system by the analysis control module;
   (b) predicting future total electricity consumption of the control system according to the present total electricity consumption;
   (c) computing reduction of electricity consumption when the predicted future total electricity consumption is possible to exceed a warning electricity consumption at the next time period;
   (d) computing executable state adjustment options by the device management modules according to the reduction of electricity consumption, wherein the device management modules are configured to compute variation of the electricity consumption between the operation states to acquire the state adjustment options according to device state diagrams stored in the device management modules, and the device state diagrams are configured to record switchable operation states of the corresponding electronic devices and the electricity consumption of operating under different operation states of the electronic devices;
   (e) selecting at least one state adjustment option of the executable state adjustment options; and
   (f) controlling state adjustment of the corresponding electronic devices to reduce total electricity consumption by the device management modules according to the selected state adjustment option.

8. The method of controlling the real-time demand control system in claim 7, wherein each electronic device has a measuring unit, and before the step (a), the method comprises following steps:

(a01) correspondingly measuring electricity consumption of the electronic devices by the measuring units;

(a02) transmitting the measured electricity consumption to the device management modules by the electronic devices;

(a03) integrating the received electricity consumption by the device management modules; and (a04) transmitting the integrated electricity consumption to the analysis control module by the device management modules.

9. The method of controlling the real-time demand control system in claim 8, wherein the device management modules are correspondingly connected to a plurality of electronic devices of a same type, and configured to integrate electricity consumption of the electronic devices.

10. The method of controlling the real-time demand control system in claim 8, wherein the device management modules are correspondingly connected to a plurality of electronic devices in the same area, and configured to integrate electricity consumption of the electronic devices.

11. The method of controlling the real-time demand control system in claim 7, wherein before the step (d), the method further comprises the following steps:

(d01) acquiring state data of the electronic devices by the device management modules;

(d02) acquiring electricity consumption of operating under different operation states of the electronic devices by the device management modules; and (d03) building the device state diagrams according to the acquired state data and electricity consumption, wherein each device state diagram is corresponding to each electronic device.

12. The method of controlling the real-time demand control system in claim 11, wherein the device management modules are configured to analyze historical electricity consumption of the control system to acquire the state data and electricity consumption of operating under different operation states of the electronic devices.

13. The method of controlling the real-time demand control system in claim 11, wherein the device management modules simulate the electronic devices by a simulator to acquire the state data and electricity consumption of operating under different operation states of the electronic devices.

14. The method of controlling the real-time demand control system in claim 7, wherein in the step (d), the device management modules are configured to correspondingly compute influence indices between different operation states of the electronic devices according to a plurality of influence correspondence tables stored in the device management modules, wherein the influence correspondence tables are configured to record influence degrees between different operation states of the electronic device at each time period; in the step (e), the analysis control module is configured to select one or more state adjustment options which provide the minimum influence for the control system according to the influence indices.

15. The method of controlling the real-time demand control system in claim 7, further comprising following steps:

(g) after the step (d), judging whether the state adjustment options meet a plurality of non-adjusting conditions by the device management modules, wherein the non-adjusting conditions are configured to record the conditions or time periods which cannot be adjusted by the electronic devices connected to the device management modules;

(h) deleting state adjustment options which cannot be executed; and (i) executing the step (e).

16. A method of controlling a real-time demand for a control system, the control system having an analysis control module, a plurality of device management modules, and a plurality of electronic devices, wherein the analysis control module is connected to the device management modules, and the device management modules are correspondingly connected to the electronic devices; the method comprising following steps:

(a) computing present total electricity consumption of the control system by the analysis control module;

(b) predicting future total electricity consumption of the control system according to the present total electricity consumption;

(c) computing reduction of electricity consumption and announcing the reduction of electricity consumption to the device management modules when the predicted future total electricity consumption is possible to exceed a warning electricity consumption at the next time period;

(d) computing variation of electricity consumption between the operation states of the electronic devices by the device management modules according to a plurality of device state diagrams, wherein the device state diagrams are configured to record switchable operation states of the corresponding electronic devices and the electricity consumption of operating under different operation states of the electronic devices;

(e) computing influence indices between different operation states of the electronic devices by the device management modules according to a plurality of influence correspondence tables, wherein the influence correspondence tables are configured to record influence degrees between different operation states of the electronic device at each time period;

(f) acquiring a plurality of state adjustment options according to the variation of electricity consumption and the influence indices;

(g) judging whether the state adjustment options meet a plurality of non-adjusting conditions, wherein the non-adjusting conditions are configured to record the conditions or time periods which cannot be adjusted by the electronic devices;

(h) after the step (g), deleting state adjustment options which cannot be executed and transmitting the executable state adjustment options to the analysis control module;

(i) selecting one or more state adjustment options which provide the minimum influence for the control system by the analysis control module according to the influence indices; and (j) controlling state adjustment of the corresponding electronic devices to reduce total electricity consumption by the device management modules according to the selected state adjustment option.

17. The method of controlling the real-time demand control system in claim 16, wherein the device management modules are correspondingly connected to a plurality of electronic devices in the same type or in the same area and configured to integrate electricity consumption of the electronic devices; and configured to provide the integrated electricity consumption of the electronic devices to the analysis control module.

18. The method of controlling the real-time demand control system in claim 16, wherein before the step (d), the method further comprises following steps:
- (d01) acquiring state data of the electronic devices by the device management modules;
- (d02) acquiring electricity consumption of operating under different operation states of the electronic devices by the device management modules; and
- (d03) building the device state diagrams according to the acquired state data and electricity consumption.

* * * * *